United States Patent [19]

Kordes

[11] 4,053,972
[45] Oct. 18, 1977

[54] METHOD OF CONSTRUCTING INSULATED DOOR

[75] Inventor: Myron G. Kordes, Parkville, Mo.
[73] Assignee: Hobart Corporation, Troy, Ohio
[21] Appl. No.: 711,453
[22] Filed: Aug. 4, 1976
[51] Int. Cl.$^2$ .................................... B23P 17/00
[52] U.S. Cl. ........................ 29/423; 29/451; 29/458; 29/460; 49/501; 52/309.11; 264/46.5
[58] Field of Search ............. 29/451, 423, 460, 458; 264/46.5; 52/309.11; 312/214; 49/478, 501

[56] References Cited

U.S. PATENT DOCUMENTS

| | | | |
|---|---|---|---|
| 2,924,861 | 2/1960 | Viets | 264/46.5 X |
| 3,000,058 | 9/1961 | Thielen, Jr. | 264/46.5 |
| 3,078,134 | 2/1963 | Haynes, Jr. | 49/478 X |
| 3,152,199 | 10/1964 | Roberts | 264/46.5 |
| 3,359,053 | 12/1967 | Hagendoorn | 312/214 X |
| 3,512,323 | 5/1970 | Hupfer | 264/46.5 X |

Primary Examiner—Charlie T. Moon
Attorney, Agent, or Firm—Biebel, French & Nauman

[57] ABSTRACT

An insulated door for refrigerators, freezers or similar cabinets where the inner and outer door surfaces are normally subjected to substantially different temperatures. The main door components, the door face and drum, are interconnected without the use of threaded fasteners such as screws or bolts. Instead a hardened, foamed in situ insulating material forms the main interconnection between the door face and drum, securing them together but yet accommodating thermally induced, relative movement between the two components. In constructing the door S-shaped retainers are used which receive in their oppositely opening loops the edges of the face and drum. Temporary spacers are then interposed between the face and drum edges for the foaming operation. Following the filling of the door cavity with insulating material the spacers are removed and an anchoring leg of a gasket is snapped into place into the cavity left by the removal of the spacers, securing the gasket to the door without the use of screws or other mechanical fasteners, but permitting gasket to be removed as necessary for replacement or repair.

6 Claims, 7 Drawing Figures

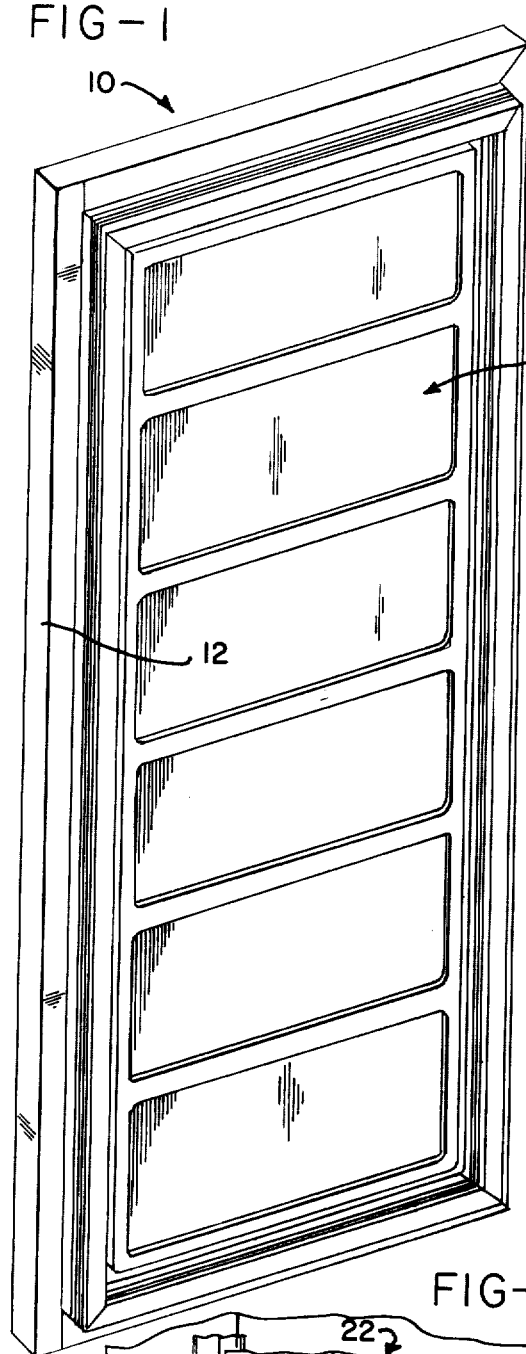
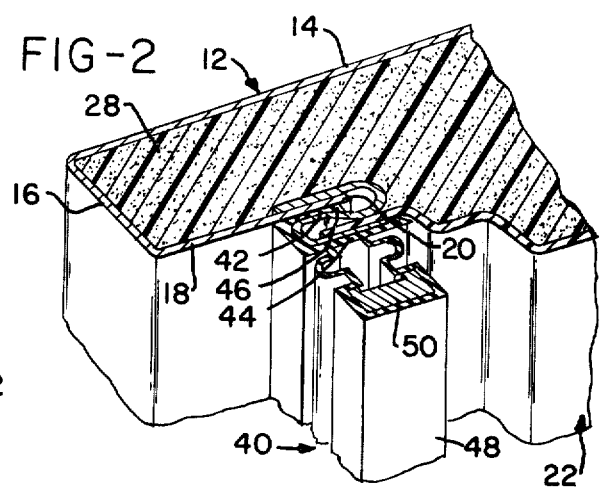
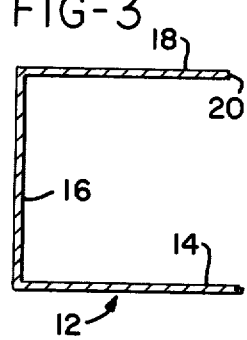
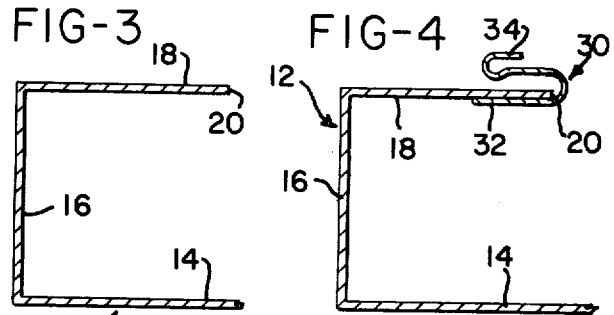
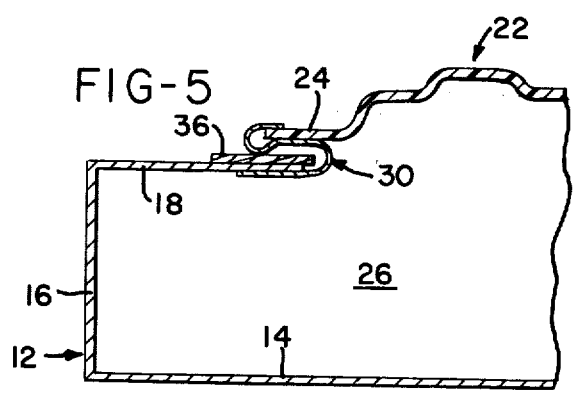
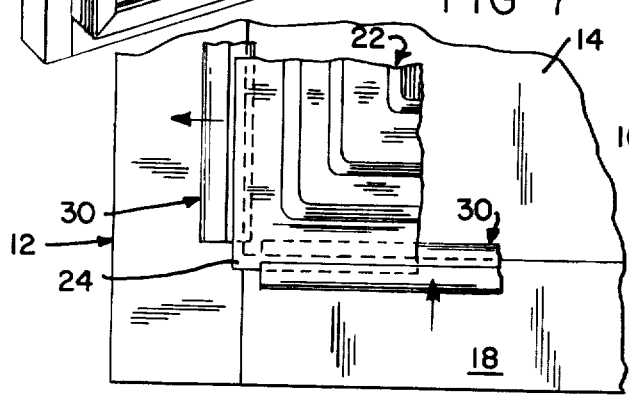
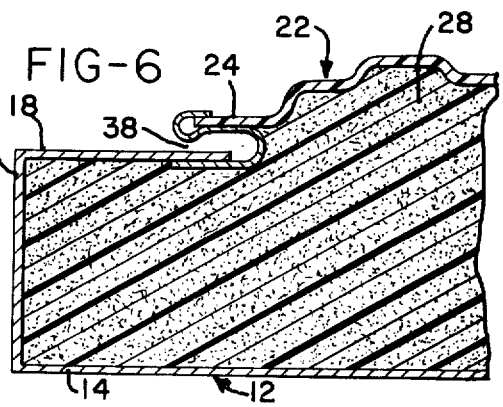

METHOD OF CONSTRUCTING INSULATED DOOR

BACKGROUND OF THE INVENTION

Insulated doors for refrigerators, freezers and other insulated cabinets are usually constructed of two main components, an outer "face" and an inner "drum". The hollow chamber defined by these two members is then filled with an insulating material such as a foamed polyurethane which is poured into the chamber in liquid form and foamed in situ.

To secure the drum to the door face the most common approach has been to use screws or bolts extending through the opposed peripheral edges of the door face and the drum. Alternatively, a bridging strip may be used where the drum and face are both made of metal and the strip may be welded to the edges of the drum and the face.

Both of these approaches to assembling the door drum and face have a very serious drawback in that the drum and the face, that is the inner and outer surfaces of the insulated door, will be subjected to significantly different temperatures. For example, a freezer may be operated with its interior temperature at around 0° F. while the outside temperature in which the freezer is located may well be 80° or more. This obviously results in a thermally induced relative movement between the inner and outer surfaces of the insulated door, and, where the drum is fixed to the face by screws or other rigid fasteners, cracking and other damage to the door will often result.

Suggested solutions to this problem have been the use of a snap-in inner door liner, such as shown in U.S. Pat. No. 3,882,637, which is designed to permit relative movement between the inner and outer door components, and the use of interfitting joints between the door face and drum, as in U.S. Pat. No. 3,883,198 and 3,915,527, designed to permit sliding movement between the interengaging edges of the two door components.

Obviously where the inner liner of the door is of larger size than the opening in the door face into which it is positioned to provide a snap-in construction special handling and manipulation of the door components during assembly is required. By the same token where an interfitting edge construction is utilized it will be apparent that these edges must be rolled or otherwise formed to provide the reversely bent edges along the door components.

A similar, related problem in the construction of insulated cabinet doors has been the attachment of the sealing gasket to the door. These gaskets are resilient and often magnetic and designed to be interposed between the inner surface of the door and the opposing portions of the cabinet to form an air-tight seal.

Quite often such gaskets are attached to the drum of the door by means of threaded fasteners, as shown in U.S. Pat. No. 3,078,003, wherein the same screws which secure the gasket to the door also secure the drum to the face of the door. A somewhat similar construction is shown in U.S. Pat. No. 3,359,053, wherein the bolts or screws which secure the drum of the door to the door face also pass through clips which engage the gasket and hold it in place.

Both of these constructions present the same problems as those discussed above with respect to the attachment of the door drum to the door face. Namely, that by providing a rigid connection between the edges of the door drum and face, when thermally induced relative movement between these components occurs there is a tendency for the components to crack or otherwise become damaged.

Another approach is shown in French Pat. No. 1,362,178, wherein the sealing gasket also performs a second function of attaching means to hold the door face and door drum together while a foamed in situ material is cured to thereafter serve as a structural component of the door. However with this construction, the gasket is permanently embedded in the door, rendering it virtually impossible to remove it for replacement or repair. Additionally, the protruding gasket which must be positioned in place during the foaming operation is obviously positioned such that it can be easily damaged during handling of the door immediately prior and subsequent to the foaming operation.

While the above noted French patent also discloses an embodiment in which the gasket appears to be removable, in this embodiment the door drum and door face are not provided with securing means during the foaming operation, but are presumably held in position with respect to each other with some type of fixture which is not disclosed. Suffice it to say that maintaining the door components in the desired position solely by means of the fixture holding the door during the foaming operation would be extremely difficult if not impossible from a practical point of view.

SUMMARY OF THE INVENTION

An insulated cabinet door in accordance with the present invention is constructed without screw threaded or other rigid fasteners interconnecting the opposing edges of the door face and drum to allow the door to accommodate thermally induced, relative movement between these two components without damage to the door. However, fasteners are utilized which, while cooperating with other components to position the door face and drum during foaming, still permit relative thermally induced movement between the drum and face and provide means for readily removing the gasket as needed. Additionally, the gasket need not be installed until after the foaming operation, thereby greatly decreasing the risk of damage to the gasket during construction of the door.

Specifically, the door face and drum are assembled in a suitable fixture with their opposed edges arranged adjacent to each other but spaced from one another a certain distance, with the maximum spacing limited by the use of S-shaped retainers and the minimum spacing maintained prior to foaming by the use of temporary spacers inserted between the peripheral edge of the drum and the rim of the door face.

Thereafter, the chamber defined by the door drum and door face are provided with a filling of insulating material, preferably a foamed in situ polyurethane. The foamed insulation expands and hardens and provides the necessary interconnection between the door drum and door face and at the same time is sufficiently yielding to allow thermally induced relative movement between the door drum and face without damage to either of the door components.

Subsequent to the filling of the door with an insulation material and after the material has set sufficiently to support the drum and door in their proper position with respect to each other, the temporary spacers interposed between the peripheral edge of the drum and the rim of the door face are removed, thereby leaving a cavity extending around the inner surface of the door adjacent the periphery of the drum.

Into this cavity one leg of a specially constructed gasket, preferably of extruded construction, is inserted with another, substantially parallel leg of the gasket overlying the periphery of the drum and carrying a resilient portion which engages the opposing face of the cabinet with which the insulated door is associated. Thus the gasket for the door is attached thereto without the use of screws, bolts or other similar rigid fasteners, thereby obviating the drawbacks of such constructions as discussed above, while at the same time permitting the gasket to be removed after construction as necessary. The gasket need not be installed prior to the foaming operation, although a positive connection is provided between the door drum and face during foaming.

BRIEF DESCRIPTION OF THE DRAWINGS

FIG. 1 is a perspective view showing an inside face of the door of the present invention;

FIG. 2 is a cross-sectional view through the door of FIG. 1;

FIGS. 3 through 6 are a series of cross-sectional views similar to FIG. 2, but showing the steps of constructing a door in accordance with the present invention; and FIG. 7 is a partial plan view showing an inside corner of the door and the positioning of the retainers on the door face rim.

DESCRIPTION OF THE PREFERRED EMBODIMENTS

As seen in FIGS. 1 and 2 of the drawings, a door 10 in accordance with the present invention includes an outer door face 12 of open, tray-like configuration having an outer wall 14, side walls 16 extending from the outer wall and a rim 18 extending inwardly from the side walls over the outer wall in spaced relationship thereto and terminating in an inner edge 20 defining an opening into the tray-like face 12.

The edge 20 of the rim 18 defines an opening in the face and a drum 22 is disposed over the opening with an outer periphery 24 of the drum positioned adjacent to but spaced from opposing portions of the rim 18.

It will be particularly noted from FIG. 2 of the drawings that the face 14 and the drum 22 together define a hollow enclosed chamber 26 and into this chamber a foamed in situ insulating material 28 is placed, substantially filling the chamber and hardening to interconnect the face and the drum.

With reference to FIGS. 3 through 7 of the drawings, it will be seen that the door of the present construction is assembled by first disposing the door face 14 on a suitable supporting surface, as seen in FIG. 3, and then slipping over the edges 20 of the rim 18 retainers 30 which are of substantially S-shaped configuration and include two oppositely opening portions 32 and 34.

As seen in FIG. 4 and the left hand side of FIG. 7, the retainers 30 are slid outwardly to their full extent. Then the drum 22 is placed on the retainers and the retainers are slid inwardly, as seen in FIG. 5 and the lower portion of FIG. 7, and spacer elements 36 are inserted between the rim 18 and the opposing portions of the retainers 30.

With the assembled face, drum and retainers supported in an appropriate fixture, an insulating material is introduced into the chamber 26 where it foams, completely fills the chamber and hardens to interconnect the face 14 to the drum 22. With the components 14 and 22 thus interconnected the fixture and spacers may now be removed, providing a cavity 38 extending around the entire periphery of the door as seen in FIG. 6 of the drawings.

A gasket 40 having a pair of legs 42 and 44 and constructed of a material such as extruded vinyl plastic is now attached to the door by inserting its leg 42 into the cavity 38 between opposed portions of the periphery 24 of the door drum and the rim 18 of the door face. If desired, the leg 42 may be extruded with a barbed portion 46 and the portion 34 of the retainer may be given a slight outward bend to cooperate with the barb 46 and secure the leg 42 of the gasket in the cavity 38.

With leg 42 secured in the cavity 38 the opposite leg 44 overlies the periphery of the drum and carries a sealing element 48 which may contain a flexible strip magnet 50 to provide an air-tight seal with opposing surfaces of the cabinet with which the door 10 is associated.

As noted above, in a cabinet wherein the gasket is carried by the cabinet face, a door may be manufactured in accordance with the present invention as described above except that the necessity of providing a cavity 38 about the periphery of the door is eliminated.

From the above it will be apparent that the present invention provides an improved insulated door construction wherein the main door components are assembled without the use of screws, bolts or other rigid fasteners nor special shaping of the cooperating edges of the door face and drum and wherein the resilient gasket carried by the door is also secured thereto without screws, bolts or other threaded fasteners yet is capable of subsequent removal and need not be installed until a late stage of the door construction process.

While the method and article herein described constitute preferred embodiments of the invention, it is to be understood that the invention is not limited to this precise method and article, and that changes may be made therein without departing from the scope of the invention.

What is claimed is:

1. A method of constructing an insulated door comprising the steps of:
providing an open, tray-like face having an outer wall, side wall portions extending from said outer wall and a rim extending from said side wall portions inwardly over said outer wall in spaced relationship thereto and terminating in an inner edge defining an opening into said tray-like face,
positioning a drum having an outer periphery over said opening in said tray-like face,
loosely engaging said face rim and said drum periphery with additional separate means restraining relative movement of said face and said drum away from each other while permitting said rim and said periphery to be spaced from each other to define a cavity around said door,
introducing into the space defined by said opposing portions of said drum and said face a foamed in situ insulating material which expands and hardens and adheres to surfaces of said drum, said face and said restraining means, and
subsequent to hardening of said insulating material, attaching a peripheral gasket to said insulated door by inserting an anchoring portion of said gasket into said cavity between said face rim and drum periphery.

2. The method of claim 1 further comprising:
inserting spacing means in said cavity between said facing rim and drum periphery after said rim and periphery are loosely engaged and prior to the introduction of insulating material between said face and said drum and removing said spacing means from said cavity after said hardening of said insulating material.

3. The method of claim 1 wherein:
said step of loosely engaging said rim and said periphery comprises engaging said rim and said periphery with substantially S-shaped retaining means having oppositely opening portions receiving said rim and said periphery.

4. The method of claim 3 wherein said step of loosely engaging said rim and said periphery includes:
loosely positioning said retaining means on said rim of said face with said retaining means displaced outwardly of said face and an edge of said rim substantially seated in a first of said portions of said retaining means,
positioning said drum over said face with said periphery of said drum disposed opposite the second of said portions of said retaining means, and
displacing said retaining means inwardly of said face to receive said drum periphery in said second of said portions of said retaining means.

5. The method of claim 4 further comprising:
positioning spacing means within said first of said portions of said retaining means intermediate said face rim and said drum periphery.

6. The method of claim 5 further comprising:
removing said spacing means after said insulating material has hardened to thereby provide said cavity for said anchoring portion of said peripheral gasket.

* * * * *